United States Patent [19]

Palazzo

[11] 3,857,845
[45] Dec. 31, 1974

[54] 1-[3-(4-METRACHLOROPHENYL-1-PIPERAZINYL)-PROPYL]-3,4-DIETHYL-$\Delta^2$-1,2,4-TRIAZOLIN-5-ONE

[75] Inventor: Giuseppe Palazzo, Rome, Italy

[73] Assignee: Aziende Chimiche Ruinite Angeline Franceso A.C.R.A.F. S.p.A., Rome, Italy

[22] Filed: Oct. 15, 1973

[21] Appl. No.: 406,432

[30] Foreign Application Priority Data
Oct. 16, 1972 Italy.................................. 53380/72

[52] U.S. Cl......... 260/268 PH, 260/308 C, 424/250
[51] Int. Cl............................................. C07d 51/70
[58] Field of Search.................. 260/268 PH, 308 C Primary Examiner—Donald G. Daus
Assistant Examiner—Jose Tovar
Attorney, Agent, or Firm—Ladas, Parry, Von Gehr, Goldsmith & Deschamps

[57] ABSTRACT

The novel compound 1-[3-(4-metachlorophenyl-1-piperazinyl)-propyl]-3,4-diethyl-$\Delta^2$-1,2,4-triazolin-5-one having hypotensive and analgesic activity is disclosed.

1 Claim, No Drawings

1-[3-(4-METRACHLOROPHENYL-1-PIPERAZINYL)-PROPYL]-3,4-DIETHYL-Δ-1,2,4-TRIAZOLIN-5-ONE

BACKGROUND OF THE INVENTION

This invention relates to a new chemical compound which has hypotensive and analgesic activity without possessing high toxicity.

SUMMARY OF THE INVENTION

The novel compound of this invention is 1-[3-(4-metachlorophenyl-1-piperazinyl)-propyl]-3,4-diethyl-$\Delta^2$-1,2,4-triazolin-5-one, designated as having the following formula (I):

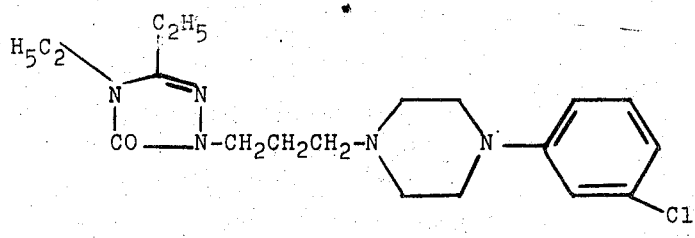

and the pharmaceutically acceptable salts thereof and the preparation of this compound and its salts.

I. Can be used as a salt with mineral acids such as, for instance, hydrogen chloride, sulfuric acid, phosphoric acid, etc., or with aliphatic mono- or poly-carboxylic acids, such as formic acid, acetic, lactic, succinic, malonic, glutaric, adipic, tartaric, citric, maleic, fumaric acid, etc., or with aromatic acids, such as benzoic, salycilic, pamoic acid, etc., or with mandelic, diphenylacetic, benzylic acid, etc., or with sulfonic acids, such as methanesulfonic, benzenesulfonic, toluenesulfonic acid, etc., or with sulfamic acids, such as cyclamic acid etc.

I. Has displayed some interesting pharmacological properties. It is, above all, interesting to note a modification of the animal behavior, which is typical of tranquillizers, and is characterized by sedation, a reduced activity towards the experimentor and a lower motor activity. Moreover, a hypotensive and analgesic activity are observed with (I); the first is evident both in the normal and in the hypertensive rat, the second is evident in the phenylquinone test and in the tail writhing test. Since (I) is scarcely toxic both in acute and chronic tests, it could be interesting as an anti-anxiety and, in general, as a tranquillizer in human therapy.

DETAILED DESCRIPTION OF THE INVENTION

A process of preparation of (I) consists in the reaction between the known 3,4-diethyl-$\Delta^2$-1,2,4-triazolin-5-one and a suitable substituted piperazine, according to the scheme:

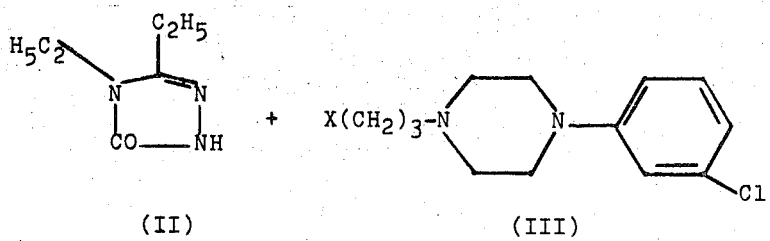

where X = halogen, or another suitable leaving group such as, for instance, $OSO_2CH_3$, $OSO_2C_6H_4CH_3$, $OC_6H_4NO_2$, etc.

For carrying out this reaction, it is first necessary to salify 3,4-diethyl-$\Delta^2$-1,2,4-triazolin-5-one, for instance with an alkaline alcoholate, or with sodium amide or with sodium hydride, then heat is applied to the reaction mixture for a few hours in a solvent such as, for instance, dioxane, benzene, alcohol, tetralin, dimethylsulfoxide, dimethylformamide.

Variations of the above process are shown in the following Schemes A and B:

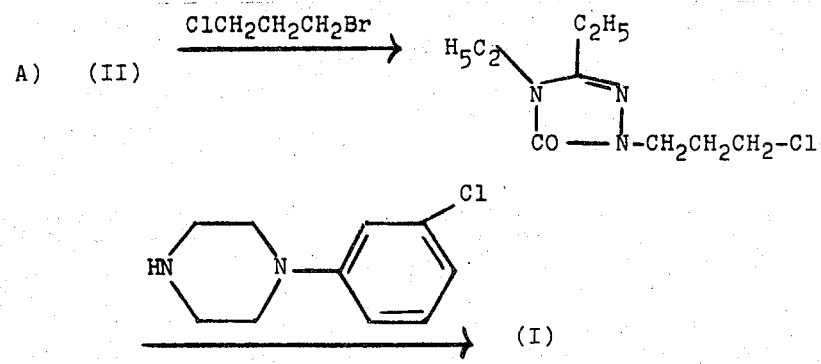

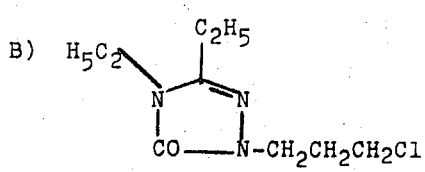
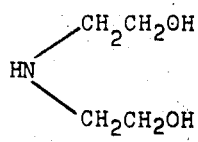
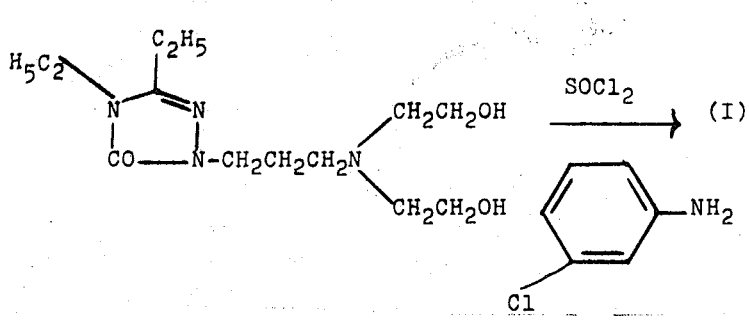

In Scheme (A) N-metachlorophenyl-N'-halo-n-propylpiperazine is considered as the sum of 1-bromo-3-chloropropane and N-metachlorophenyl-piperazine. First of all a reaction is carried out between an alkaline salt of 3,4-diethyl-$\Delta^2$-1,2,4-triazolin-5-one and 1-bromo-3-chloropropane in a suitable solvent, such as, for instance, alcohol. Later on, 1-(3-chloropropyl)-3,4-diethyl-$\Delta^2$-1,2,4-triazolin-5-one is heated for a few hours with N-metachlorophenyl-piperazine in an inert solvent in the presence of an HCl acceptor.

In Scheme (B) N-metachlorophenyl-piperazinopropyl chain is built on 3,4-diethyl-$\Delta^2$-1,2,4-triazolin-5-one in three subsequent operations. The first one, which is common also to Scheme (A), consists in the preparation of 1-(3-chloropropyl)-3,4-diethyl-$\Delta^2$-1,2,4-triazolin-5-one. The product is then heated with an excess of diethanolamine and 1-(3-bis-hydroxy-ethylaminopropyl)-3,4-diethyl-$\Delta^2$-1,2,4-triazolin-5-one is isolated. The metachlorophenyl-piperazine ring is then built on to this compound, first by treating the product with thionyl chloride and later on with metalchloroaniline, even without isolating the reaction product.

The pharmacological effect of the compound of this invention (I) was evaluated in accordance with the following known procedures:

Effects on behavior (rats and mice)

Irwin, S. "Pharmacologic Techniques in Drug Evaluation" — Year Book Medical Publishers, Chicago, 1964, p. 36.

Effects on conditioned reflexes on mice

Bovet, D.; Gatti, G.L. and Frank, M. — Sci. Reps. Ist. Super. Sanita., 1961, 1, 127.

Effects on spasms provoked by serotonin (50 ug./kg.) and by histamine (16 ug./kg.) in guinea pigs Konzett, H. and Roessler R. — Arch. Exp. Path. Pharmakol., 1940, 195, 71.

The compound of the invention can be administered either alone or in admixture with a pharmaceutical carrier which is selected with regard to the intended route of administration and standard pharmaceutical practice, as is well known in the art. Compound (I) may be administered orally in the form of tablets containing such excipients as starch or lactose, or in capsules either alone or in admixture with excipients, or in the form of elixirs or suspensions containing flavoring or coloring agents. (I) May be injected parenterally, for example, intramuscularly or subcutaneously. For parenteral administration, (I) may best be used in the form of a sterile aqueous solution which may contain other solutes, for example, enough salts or glucose to make the solution isotonic. (I) Can be administered alone or in admixture with other active agents.

With respect to dosage levels, the physician in any event will be easily able to determine the actual dosage which will be the most suitable for any individual patient and it will vary with age, the weight and response of the particular patient. In general the daily dose will range from 50 to 300 mg., according to the cases treated, and an individual dose will contain about 25 mg. of the active compound (I).

ACUTE TOXICITY OF (I) IN MICE AND RATS

| Animal species | administration Route | No. of animals | LD 50 mg./kg. | Confidential limits | S |
|---|---|---|---|---|---|
| mice | i.v. | 36 male | 72 | 68–76 | 1,16 |
| | | 52 female | | | |
| | i.p. | 35 male | 123 | 114–132 | 1,15 |
| | | 35 female | | | |
| | * s.c. | 16 male | 225 | 197–258 | 1,20 |
| | | 12 female | | | |
| | p.o. | 36 male | 545 | 440–676 | 1,51 |
| | | 12 female | | | |
| rats | i.v. | 26 male | 62 | 58–66 | 1,11 |
| | | 28 female | | | |
| | i.p. | 32 male | 120 | 107–135 | 1,16 |
| | | 32 female | | | |
| | * s.c. | 46 male | 525 | 456–604 | 1,41 |
| | | 47 female | | | |
| | p.o. | 26 male | 720 | 630–822 | 1,23 |
| | | 28 female | | | |

* 20 ml./kg. of solution

EXAMPLE 1

3,4-Diethyl-$\Delta^2$-1,2,4-triazolin-5-one (62 g.) is dissolved in anhydrous dioxane (about 500 ml.) NaH (21 g.) in a 50 percent oily suspension is added. The solution is heated for 30 minutes under reflux and N- metachlorophenyl-N'-(3-chloro-n-propyl)piperazine (119 g.) is added under stirring. The solution is heated for 20 hours under reflux. The solvent is then eliminated under reduced pressure and the residue is treated with 2N HCl. The solution is washed with ether so as to eliminate the oil present in the hydride solution, and made alkaline with 50% $K_2CO_3$. It is extracted with ether and dried, the solvent is eliminated and the residue is distilled under reduced pressure. 115 G. of a substance are obtained. B.P. 230° at 0.5 mm. The salts were prepared by standard procedures. The hydrochloride, which crystallizes from isopropanol, shows m.p. 197°–8°C. The sulfate melts at 178°–80°C., the phosphate at 164°–6°C., the maleate at 122°–3°C., the benzilate at 132°–3°C., and p-toluenesulfonate at 127°–9°C.

EXAMPLE 2

3,4-Diethyl-$\Delta^2$-1,2,4-triazolin-5-one (6 g.) and 3-bromo-1-chloropropane (6.6 g.) are added to a solution of Na (0.98 g.) in methanol (20 ml.). The solution is refluxed until the pH becomes neutral, poured into water, extracted with ether; the solvent is eliminated and the residual oil is distilled. 1-(3-Chloropropyl)-3,4-diethyl-$\Delta^2$-1,2,4-triazolin-5-one boils at 121° at 0.05 mm.

EXAMPLE 3

1-(3-Chloropropyl)-3,4-diethyl-$\Delta^2$-1,2,4-triazolin-5-one (1 g.), metachlorophenyl-piperazine (0.9 g.) and triethylamine (0.46 g.) in toluene (25 ml.) are refluxed for 12 hours. The solution is treated with 5N NaOH, extracted with ether and steam-distilled. The residue from the distillation is extracted with ether and the ethereal solution is treated with ethereal HCl. The hydrochloride precipitates which is crystallized from isopropanol and is identical to the one prepared according to Example 1.

EXAMPLE 4

1-(3-Chloropropyl)-3,4-diethyl-$\Delta^2$-1,2,4-triazolin-5-one (1.5 g.) and diethanolamine (1.5 g.) are heated at 100° for 15 hours. The solution is treated with $CHCl_3$ (10 ml.) and shaken with $Al_2O_3$ (II/III) (0.5 g.). The solution is filtered and, after elimination of the solvent, the residual oil is distilled. 1.4 G. of 1-(3-bishydroxyethylaminopropyl)-3,4-diethyl-$\Delta^2$-1,2,4-triazolin-5-one are obtained. B.P. 205–10° at 0.1 mm. 1-(3-Bishydroxyethylaminopropyl)-3,4-diethyl-$\Delta^2$-1,2,4-triazolin-5-one (1.3 g.) is treated with thionyl chloride (1.3 ml.) for 30 minutes at 75°. The excess of thionyl chloride is eliminated in a rotating evaporator and the residue is dissolved in amyl alcohol (30 ml.). Metachloroaniline (0.57 g.) is added to the solution which is boiled at 150° in a nitrogen stream for 8 hours. The basic portion is extracted and the solution is steam-distilled. The residue from the distillation is extracted with ether and treated with ethereal HCl; 1-[3-(4-metachlorophenyl-1-piperazinyl)-propyl]-3,4-diethyl-$\Delta^2$-1,2,4-triazolin-5-one hydrochloride (m.p. 197°–8° from isopropanol), identical to the one obtained according to Example 1, is obtained.

What is claimed is:

1. 1-[3-(4-meta-Chlorophenyl-1-piperazinyl)-propyl]-3,4-diethyl-$\Delta^2$-1,2,4-triazolin-5-one of the formula:

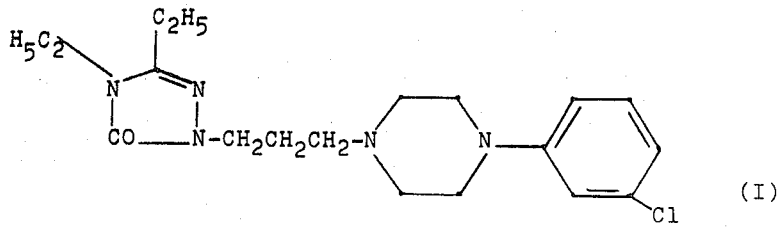

(I)

or the pharmaceutically acceptable acid-addition salts thereof.

* * * * *